INVENTOR
Edward C. Hartwig.

Nov. 29, 1955   E. C. HARTWIG   2,725,472
WELD LOCKOUT FOR SEQUENCE TIMERS
Filed Feb. 13, 1953   2 Sheets-Sheet 2

WITNESSES:
John E. Healy
Leon J. Gaya

INVENTOR
Edward C. Hartwig
BY
Hymen Diamond
ATTORNEY

United States Patent Office

2,725,472
Patented Nov. 29, 1955

2,725,472

WELD LOCKOUT FOR SEQUENCE TIMERS

Edward C. Hartwig, Walnut Creek, Calif., assignor to Westinghouse Electric Corporation, East Pittsburgh, Pa., a corporation of Pennsylvania Application February 13, 1953, Serial No. 336,741

17 Claims. (Cl. 250—27)

My invention relates to electric discharge apparatus and has particular relation to sequence timers which have general use for timing the sequences of industrial operations and are of particular use in welding.

The sequence timers used for timing the operations of welding apparatus include a squeeze component for timing the so-called sequence interval during which the welding electrodes are engaged with the work and pressure is applied to the work; a weld component which times the duration of the flow of welding current through the work, a hold component which times the interval during which the welding electrodes are engaged with the work after the cessation of the flow of welding current to permit the work to harden, and an off interval during which the apparatus is reset for a succeeding welding operation. There may be components in addition to these, such as a component for timing a forge interval during which the pressure applied to the work is changed while the welding current is still flowing.

In accordance with the teachings of the prior art of which I am aware, the sequence timers include discharge devices, preferably thyratrons, and capacitor-resistor networks. The networks are connected in the control circuits of corresponding discharge devices, and the sequencing is effected by a change in the conductivity of the discharge devices, first when the network is set for timing and later when the network times out. Certain of the discharge devices are connected to the operating mechanisms of the welding apparatus in such manner that when their conductivity changes, the corresponding mechanisms of the apparatus are actuated.

In general, the networks may be connected to the corresponding discharge devices in such manner that when the networks time out, the discharge devices are rendered either conductive or non-conductive, but it is customary as a matter of convenience to connect the networks to the discharge devices in such manner that when the networks are set for a timing operation, the discharge devices which cause the actuation of the part of the parts of the welder involved are rendered non-conductive. When the timing operation starts, these discharge devices remain non-conductive and when the corresponding networks time out, the discharge devices are rendered conductive to actuate the corresponding parts of the welding apparatus. Thus, the network of the squeeze component when set for a timing operation maintains a thyratron non-conductive. When the squeeze network times out, this thyratron is rendered conductive, starting the flow of welding current through the work. Similarly, the network of the weld component when set for timing maintains a thyratron non-conductive. At the end of the weld time, this thyratron is rendered conductive and stops the flow of welding current. The hold network maintains a third thyratron non-conductive when it is set for timing and permits this thyratron to conduct at the end of the hold time to cause the electrodes to disengage the work. The off network is correspondingly connected.

Of the various operations performed by a sequence timer, the termination of the weld time is the most important. The failure to terminate the weld time properly may result in the damage to the work being welded at substantial cost.

It is accordingly an object of my invention to provide a sequence timer, which shall operate positively and without failure to terminate an initial time interval of the sequence timed.

A more specific object of my invention is to provide a sequence timer for welding apparatus which shall operate positively and without failure to terminate the weld time.

Another specific object of my invention is to provide a sequence timer of the above-described type including facilities for preventing failure to terminate the weld time on the failure of the thyratron which is to terminate the weld time.

A further object of my invention is to provide welding apparatus, the operation of which shall be positively stopped on the failure of a critical thyratron of the sequence timer.

A still further object of my invention is to provide a sequence timer of the above-described type including facilities which shall anticipate the failure of the thyratron or other discharge device which is to terminate a critical time interval and provide protection against such failure.

An incidental object of my invention is to provide a novel electronic circuit.

Another incidental object of my invention is to provide novel electronic apparatus in which power is supplied through discharge devices including facilities for terminating the operation of the apparatus on the failure of one of the discharge devices.

In accordance with the specific aspects of my invention, I provide a sequence timer including a pair of parallel connected thyratrons one of which alone is capable of terminating the weld or other critical interval, but which operate together simultaneously to terminate this interval. Since it is unlikely that both thyratrons may fail simultaneously, this concept affords a degree of protection against failure of the critical thyraton. However, the protection so afforded is not entirely adequate, since the failure of one of the thyratrons permits the operation to continue and the operator being unaware that the one thyratron has failed, may continue to use the apparatus until the other fails, so that the work may be seriously damaged.

In accordance with a further aspect of my invention, I provide means interconnecting the two parallel connected thyratrons and the other components of the sequence timer in such manner that so long as both of the parallel connected thyratrons operate properly, the sequence timer carries out its normal sequencing operations, but on the failure of one or the other of the parallel connected thyratrons, the sequencing of the sequence timer is blocked. To accomplish this object, the parallel connected thyratrons are interconnected through the primary of a transformer in such manner that when both discharge devices conduct, the output of the transformer is zero, and when only one conducts, the output is of substantial magnitude. The secondary of this transformer is connected to supply blocking potential to the thyratron which resets the weld network for the succeeding operations, thus preventing the resetting of the weld network once one of the thyratrons fails.

The last-described aspect of my invention is in accordance with a further aspect of my invention broadly applied to the control of discharge devices which are connected in parallel to supply a load. Such discharge devices are usually connected through a balancing reactor. In accordance with my invention I provide a transformer connected as described above; the secondary of this transformer is connected to block further conduction of the discharge devices once one of them fails.

The novel features that I consider characteristic of my invention are set forth generally above. My invention, both as to its organization and its method of operation, together with additional objects and advantages thereof, will be further clarified by the following description of specific embodiments when read in connection with the accompanying drawing in which.

Figure 1:
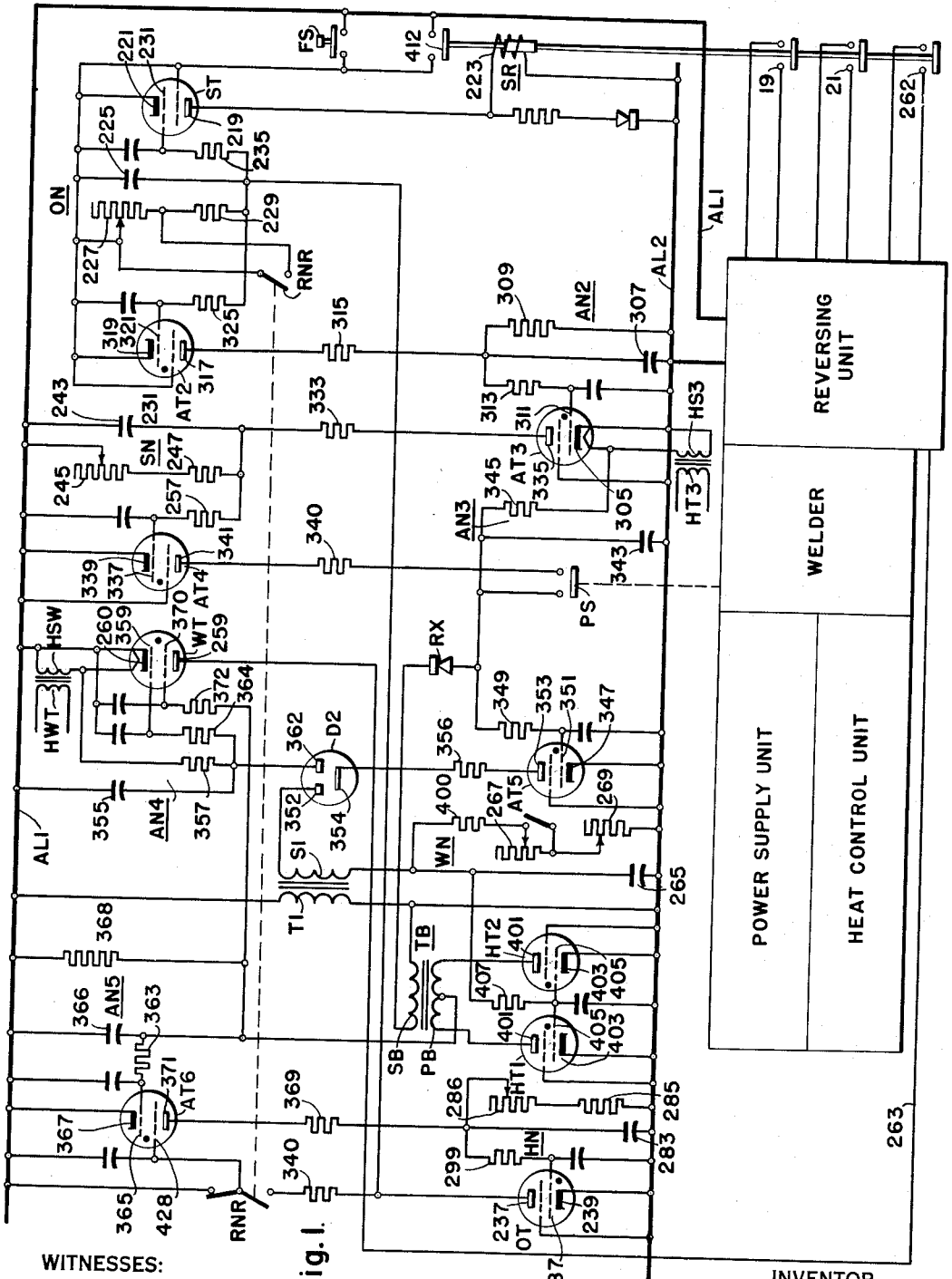
Figure 1 is a circuit diagram showing a preferred embodiment of my invention.

In Fig. 1, my invention is shown as embodied in a sequence timer of the specific type disclosed in application, Serial No. 272,818, for Electric Discharge Apparatus, filed February 21, 1952 to Clarence B. Stadum, Hubert W. Van Ness and me and assigned to Westinghouse Electric Corporation. My invention, of course, may be embodied in sequence timers of other types and such embodiments of my invention are within the scope thereof.

DESCRIPTION—FIGURE 1

Since my invention is concerned essentially with the sequence timer, only this portion of the complete welding apparatus is shown in detail. The remainder of the apparatus is represented by a block and is identical to the corresponding apparatus disclosed in application 272,818. To facilitate the understanding of Fig. 1, the various labelled components disclosed in this figure are labelled in the same manner as the corresponding components of application 272,818 to the extent practicable.

The sequence timer disclosed includes a squeeze thyratron ST, a weld thyratron WT, a pair of hold thyratrons HT1 and HT2, and an off thyratron OT. The apparatus also includes a squeeze network SN, a weld network WN, a hold network HN, and an off network ON. The squeeze network includes a capacitor 243, a variable resistor 245 and a fixed resistor 247 in parallel with the capacitor. In operation, the capacitor is charged and when the charging is terminated, discharges through the resistors 245 and 247. The resistor 245 may be set to determine the rate of discharge and thus the duration of the squeeze interval.

The weld network consists of a capacitor 265 in parallel with which a fixed resistor 400 and a pair of variable resistors 267 and 269 are connected. The resistors 267 and 269 may be set to determine the rate of discharge of the capacitor when it is charged and thus the duration of the weld time. The hold network consists of a capacitor 283 having in parallel with it a fixed resistor 285 and a variable resistor 286 which determine the rate of discharge of the capacitor 283 when charged and thus the hold time. The off network consists of a capacitor 225, a variable resistor 227 and a fixed resistor 229 which are in parallel with the capacitor 225 and which determine its rate of discharge when it is charged.

As in the apparatus shown in application 272,818, the sequence timer is supplied from buses AL1 and AL2.

The squeeze thyratron ST has an anode 219, a cathode 221 and a control electrode 231. The anode and cathode of the thyratron ST are connected through the exciting coil 223 of the starting relay SR in a circuit extending from bus AL2, through the coil 223, the anode 219 and cathode 221, and normally open starting switch FS which may be a foot switch to bus AL1. The anode-cathode circuit of the squeeze thyratron ST is thus open in the quiescent condition of the apparatus and the relay SR is deenergized.

The weld thyratron WT has an anode 259, a cathode 260, and a pair of control electrodes 359 and 370. The anode 259 and the cathode 260 of the weld thyratron are connected in a circuit identical to the circuit disclosed in application 272,818 through the conductor 263. This connection is such that when the weld thyratron WT is conductive, the heat control unit is actuated and welding current is supplied to the welder.

The hold thyratrons are tubes of the same type. Each includes an anode 401, a cathode 403 and a control electrode 405. The cathodes are connected together to bus AL2. The anodes are connected each to a terminal conductor of the primary PB of a transformer TB, the secondary SB of which is connected to block further operation of the sequence timer when one or the other of the thyratrons HT1 becomes defective. The transformer TB may conveniently be called the blocking transformer. The primary PB has an intermediate conductor and it is connected to the bus AL1 through an auxiliary capacitor-resistor network AN5. This network includes a capacitor 366 and a resistor 368 which are so dimensioned that when the capacitor is charged and the charging is interrupted, the capacitor discharges through the resistor in a short time interval of the order of a period of a 60-cycle supply or less.

The off thyratron has an anode 237, a cathode 239 and a control electrode 287. The anode and cathode of the off thyratron are connected in a circuit extending from the bus AL1 through the switch FS, the off network ON, the anode 237 and cathode 239, to the bus AL2.

The apparatus shown in Fig. 1 also includes a plurality of auxiliary thyratrons AT2, AT3, AT4, AT5 and AT6 and a plurality of auxiliary networks AN2, AN3 and AN4 in addition to the network AN5.

The thyratron AT2 has an anode 317, a cathode 319 and a control electrode 321. The anode and cathode of this thyratron AT2 are connected in a circuit extending from bus AL2 through network AN2, anode resistor 315, and anode 317 and cathode 319, the switch FS or contact 412 (when closed) to bus AL1. The thyratron AT3 has an anode 335, a cathode 305 and a control electrode 311. The anode and cathode of this thyratron are connected in a circuit extending from bus AL1 through the squeeze network SN, another resistor 333, anode 335, cathode 305 to bus AL2. Thyratron AT4 has an anode 341, a cathode 339 and a control electrode 337. The anode and cathode of this thyratron are connected in a circuit extending from bus AL2 through network AN3, the pressure switch PS of the welder, anode resistor 340, anode 341, cathode 339 to bus AL1. Thyratron AT5 has an anode 353, a cathode 347, and a control electrode 351. The anode and cathode of this thyratron are connected in two branch circuits. One of these extends from the bus AL1 through network AN4, one section 362–354 of a double diode D2, the anode resistor 356, the anode 353, the cathode 347 to the bus AL2. The other branch circuit is supplied from transformer T1 and extends from one terminal of the secondary S1 of this transformer through the other section 352–354 of the double diode, the resistor 356, the anode 353, the cathode 347, weld network WN to the other terminal of the secondary S1. The thyratron AT6 has an anode 371, a cathode 367, and a pair of control electrodes 365 and 428. The anode and cathode of the thyratron AT6 are connected in a circuit extending to the bus AL2 through the hold network HN, the anode resistor 369, the anode 371, the cathode 367 to the bus AL1.

The network AN2 includes a capacitor 307 having a resistor 309 in parallel therewith; the network AN3, a capacitor 343 having a resistor 345 and the secondary HS3 of the heater transformer HT3 for the cathode 305 of the thyratron AT3 in parallel therewith. The network AN4 includes a capacitor 355 having a resistor 357 in the secondary HSW of the heater transformer HWT of cathode 260 in parallel therewith. The networks AN2, AN3 and AN4 are similar to the network AN5 in that the resistor in each case is so dimensioned as to discharge the corresponding capacitor when it is charged in an interval of the order of one period of a 60-cycle supply or less.

The various capacitor-resistor networks are connected in the control circuits of the corresponding thyratrons. The squeeze network SN is connected between the control electrode 337 and the cathode 339 of the auxiliary thyratron AT4 through a grid resistor 257. The weld network WN is connected between the control electrodes 405 and the cathodes 403 of the thyratrons HT1 and HT2 through a grid resistor 407. The hold network HN is connected between the control electrode 287 and the cathode 239 of the off thyratron OT through a grid resistor 299. The off network is connected between the control electrodes 231 and 321 and the cathodes 221 and 319 respectively of the squeeze thyratron ST and the auxiliary thyratron AT2 through grid resistors 235 and 325 respectively. The network AN2 is connected between the control electrode 311 and the cathode 305 of the thyratron AT3 through grid resistor 313. The network AN3 is connected between the control electrode 351 and the cathode 347 of the auxiliary thyratron AT5 through grid resistor 349. The network AN4 is connected between the first control electrode 359 and the cathode 260 of the weld thyratron WT through the grid resistor 364. The network AN5 is connected between the other control electrode 370 and the cathode 260 of the weld thyratron WT through the grid resistor 372. The network AN5 is also connected between one of the control electrodes 365 and the cathode 367 of the auxiliary thyratron AT6 through the grid resistor 363. The secondary SB is connected across the capacitor 343 of the network AN3 through a rectifier RX. This rectifier is so poled that when a potential appears across the terminals of the secondary SB, the capacitor 343 is charged with the plate which is connected to the control electrode 351 negative and the other plate positive so that a blocking bias is impressed on the thyratron AT5.

The sequence timer disclosed in Fig. 1 in addition includes a repeat-non-repeat switch RNR. In the repeat position, this switch is connected directly between the other control electrode 428 and the cathode 367 of the thyratron AT6. In the non-repeat position, this switch connects the off network ON between the control electrode 428 and the cathode 367 of the thyratron AT6 through a resistor 340 and also shorts out the variable resistance 227 in the off network.

STANDBY—FIG. 1

Repeat

In the standby condition of the apparatus with the switch RNR set for repeat, power is applied to the apparatus. The buses AL1 and AL2 have the supply potential impressed between them and all of the cathodes of the thyratrons are energized. Since switch FS is open, thyratrons ST, AT2 and OT are deenergized. The anode circuit of the thyratron AT4 is also open at the pressure switch PS. Since thyratron AT2 is non-conductive, network AN2 is discharged and thyratron AT3 is conductive. Squeeze network SN is then charged and thyratron AT4 has a blocking potential applied in its grid circuit so that when the pressure switch first closes, it does not immediately become conductive. Since thyratron AT4 is non-conductive, network AN3 is discharged and thyratron AT5 is conductive. Networks AN4 and WN are then charged and thyratrons WT, HT1 and HT2 are non-conductive. Network AN5 is discharged and thyratron AT6 is conductive to charge network HN. Network WT is not affected by the discharged condition of network AN5 because it is held non-conductive by network AN4. Since network HN is charged, thyratron OT is non-conductive and is prevented from immediately becoming conductive when switch FS is first closed. Network ON is discharged because thyratron OT is non-conductive and thyratrons ST and AT2 are in condition to conduct once the foot switch is closed.

Non-repeat

In the non-repeat position of switch RNR, the second control electrode 428 of thyratron AT6 is connected to network ON. This network is in the standby condition uncharged and thyratron AT6 is conductive in the same manner as it is with the switch RNR in the repeat position. Since in the non-repeat position the switch RNR shunts out the variable resistor 227, the capacitor 225 if charged is capable of discharging in a short time interval of the order of a period of a 60-cycle supply or less.

OPERATION—FIG. 1

Repeat

The operation is started by closing foot switch FS. When this foot switch is closed, squeeze thyratron ST and auxiliary thyratron AT2 are immediately rendered conductive. The current flow through thyratron ST energizes relay SR and this relay is actuated. At one of its contacts 412, relay SR shunts out the foot switch FS, permitting the apparatus to pass through one cycle of operation independently of the foot switch. At the other now closed contacts 19, 21 and 262, the welder is actuated, the welding electrodes are caused to engage the work, and pressure is applied to the work so that the pressure switch PS begins to close and eventually closes, closing the anode circuit of thyratron AT4.

Since thyratron AT2 is conductive, network AN2 is immediately charged and thyratron AT3 is rendered non-conductive. Squeeze network SN then begins to discharge. This network initially impresses a blocking potential on thyratron AT4 so that the latter does not initially conduct in spite of the fact that pressure switch PS is closed.

At the end of the squeeze time, the squeeze network SN times out, permitting thyratron AT4 to conduct and charge the auxiliary network AN3. Thyratron AT5 is then rendered non-conductive. The charging of the network AN4 through one of the branches of the anode circuit of the thyratron AT5 is then interrupted and the welding thyratron WT is rendered conductive and initiates the flow of welding current through the welder. The interruption of the conduction of thyratron AT5 also stops the charging of the weld network WN in the other branch of the anode circuit of thyratron AT5 and the weld network begins to time out. At the end of the welding interval, the weld network WN discharges sufficiently to render the hold thyratrons HT1 and HT2 conductive. If both thyratrons conduct, the potential supplied by the two halves of the primary PB is balanced and the secondary potential is zero so that network AN3 is unaffected. Under such circumstances, the network AN5 is charged so that thyratrons WT and AT6 are rendered non-conductive.

When thyratron WT becomes non-conductive, the flow of welding current is interrupted. When thyratron AT6 becomes non-conductive the charging of the hold network HN is interrupted and the hold network HN begins to time out. At the end of the hold time, the off thyratron OT is rendered conductive, charging the off network ON. Squeeze thyratron ST and auxiliary thyratron AT2 are then rendered non-conductive.

When thyratron ST becomes non-conductive, relay SR becomes deenergized, opening its contacts. At its now open contacts 19, 21 and 262, the welder is actuated to relieve the pressure and to disengage the electrodes from the work. The pressure switch PS is accordingly opened. At the now open contact 412, the holding circuit for the switch FS is open but the switch FS may itself be closed. In spite of this fact, thyratron ST remains non-conductive because the off network ON is being charged by the off thyratron OT.

When auxiliary thyratron AT2 becomes non-conductive, the charging of network AN2 is interrupted and thyratron AT3 conducts, charging the squeeze network SN. Thyratron AT4 is now rendered non-conductive if the pressure switch PS is still closed. If the pressure switch PS is now open the thyratron AT4 remains non-conductive. In either event, capacitor 343 is discharged and thyratron AT5 becomes conductive, charging networks AN4 and WN. The charging of network AN4 has no effect since thyratron WT is already non-conductive. The charging of network WN renders hold thyratron HT1 and HT2 non-conductive so that the charging of network AN5 is interrupted. The latter discharges permitting thyratron AT6 to conduct and the hold network to charge. Thyratron OT then becomes non-conductive, permitting the off network to discharge. If the switch FS still remains closed when network ON has discharged, thyratrons ST and AT2 now again conduct to repeat another welding operation.

The above-described operation takes place if hold thyratron HT1 and HT2 are operating properly. If, however, one of these thyratrons should be defective so that it conducts substantially less current than the other or fails to conduct altogether, potential appears at the secondary SB of transformer TB and capacitor 343 of network AN3 remains charged in such a sense as to block the conduction of thyratron AT5. Under such circumstances, the interruption of the conduction of thyratron AT4 does not permit network AN3 to discharge. Network AN3 then remains charged, thyratron AT5 remains non-conductive, thyratron WT remains non-conductive, and network WN remains uncharged. The one of the thyratrons HT1 which is conducting then maintains the network AN5 charged and thyratron AT6 non-conductive so that the hold network remains discharged and the off thyratron remains conductive. The off network is then charged and prevents the repetition of a further sequence. The further operation of the welding apparatus is thus positively prevented in the event either of the thyratrons HT1 or HT2 becomes defective.

*Non-repeat*

With the switch RNR set for non-repeat, the second control electrode 428 is connected to the off network ON so that when the latter is charged, the thyratron AT6 is prevented from becoming conductive. Accordingly, when during the part of the sequence which follows the charging of network ON, thyratrons HT1 and HT2 again become non-conductive, thyratron AT6 does not become conductive in spite of the fact that network AN5 is discharged. The hold network HN then remains discharged and thyratron OT remains conductive, so long as switch FS remains closed. To start another welding operation, the switch must be opened. When the switch FS is opened, thyratron OT becomes non-conductive, and network ON immediately discharges, permitting thyratron AT6 to conduct, thus resetting the apparatus for another operation. Now when switch FS is closed, the sequence operation is repeated.

If thyratron HT1 or HT2 is defective, potential is supplied to network AN3 to hold thyratron AT5 non-conductive during the welding operation during which the defect appears. Before the succeeding operation, the apparatus remains unaffected so long as the switch FS remains closed. When the switch FS is now opened preparatory to starting the succeeding welding operation, thyratrons ST, AT2 and OT become non-conductive and network ON discharges, and pressure switch PS opens. Thyratron AT4 becomes non-conductive when switch PS opens but network AN3 remains charged by potential supplied by secondary SB. Thyratron AT5 then remains non-conductive and the one of thyratrons HT1 or HT2 which is not defective remains conductive. Network AN5 remains charged and thyratron AT6 remains non-conductive so that network HN remains discharged. In addition, when thyratron AT2 becomes non-conductive, network AN2 discharges, permitting thyratron AT3 to conduct and to charge squeeze network SN so that control electrode 337 of thyratron AT4 is biased.

When switch FS is now closed to start the succeeding welding operation, thyratron OT immediately conducts (because HN is discharged) charging network ON and preventing the succeeding operation from progressing. The operation of the apparatus in this case is thus positively prevented.

*General comments*

It is seen, then, that so long as both of the critical thyratrons HT1 and HT2 are capable of conducting properly, the apparatus is sequenced as desired. Should one of these thyratrons become defective, the further sequencing of the apparatus is prevented until the defective thyratron is replaced by a sound one.

It will most often happen that a defective thyratron HT1 or HT2 will entirely fail to conduct on occasions, however, a thyratron which is about to become defective and stop conducting will conduct less than normal current or on rare occasions even more than normal current. Under such circumstances potential will be produced at the secondary SB to block further operation until the defective thyratron is replaced. It is seen that my invention has the important advantage that it provides means for anticipating failure of the thyratrons HT1 and HT2 before they actually occur. Anticipatory protection against failure as indicated by abnormal or subnormal conduction of the thyratrons as just discussed is within the scope of my invention.

DESCRIPTION—FIG. 2

Figure 2:
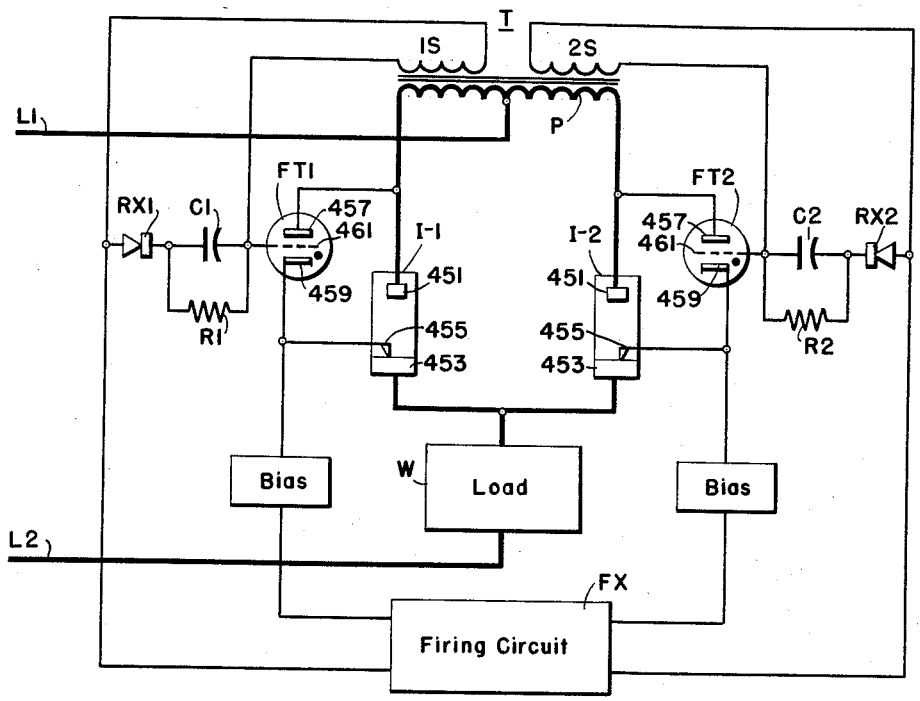
Fig. 2 is another circuit diagram showing a modification of my invention.

In Fig. 2, my invention is shown as applied to a power supply system in which a heavy load is supplied through a pair of discharge devices of heavy duty connected in parallel. This apparatus includes a pair of power supply buses L1 and L2 from which power is to be supplied to the load W. The load W is supplied through a pair of ignitrons I–1 and I–2 which are preferably of substantially similar characteristics. Each of these ignitrons includes an anode 451, a cathode 453, and an ignitor 455. The cathodes are connected together to one terminal of the load W. The other terminal of this load is connected to bus L2. Each of the anodes is connected to a terminal conductor of the primary P of a transformer T, having an intermediate conductor. The latter is connected to the bus L1.

Each of the ignitrons I–1 and I–2 is fired by a firing thyratron FT1 and FT2 respectively. Each firing thyratron has an anode 457, a cathode 459, and a control electrode 461. Firing potential is impressed between the control electrode 461 and the cathode 459 of each of the thyratrons from a firing source FX through a network including a secondary 1S and 2S respectively of the transformer T, a rectifier RX1 and RX2 respectively and capacitor C1 and C2 respectively connected across each secondary.

OPERATION—FIG. 2

So long as the ignitrons I–1 and I–2 are sound, both are fired substantially simultaneously by potential derived from the firing source FX through the thyratrons FT1 and FT2. The current flow through each of the halves of the primary P is substantially equal to the current flow through the other half and the secondary potentials of the transformer T is substantially zero. Each of the ignitrons I–1 and I–2 is prevented from hogging the current, because any tendency of the current in one ignitron to increase produces an increase in the anode potential of the other ignitron, thus counteracting this tendency.

If one of the ignitrons I–1 or I–2 is defective so that substantially less current flows through it than through the other ignitron, a substantially potential is produced at the secondary 1S and 2S of the transformer T. Current then flows through rectifiers RX1 and RX2 to charge the capacitor C1 and C2. These capacitors are charged in such a sense as to block further conduction of the thyratrons FT1 and FT2 and thus to interrupt the operation of the system.

For safety purposes, the capacitors may be shunted by very high resistors R1 and R2 which permit the capacitor to discharge during a time interval which is long compared to a period of the supply L1, L2. These resistors maintain the capacitors discharged so that personnel is not endangered, but are sufficiently large to assure that the operator will realize that the apparatus is not operating properly.

FIGURE 3

Figure 3:
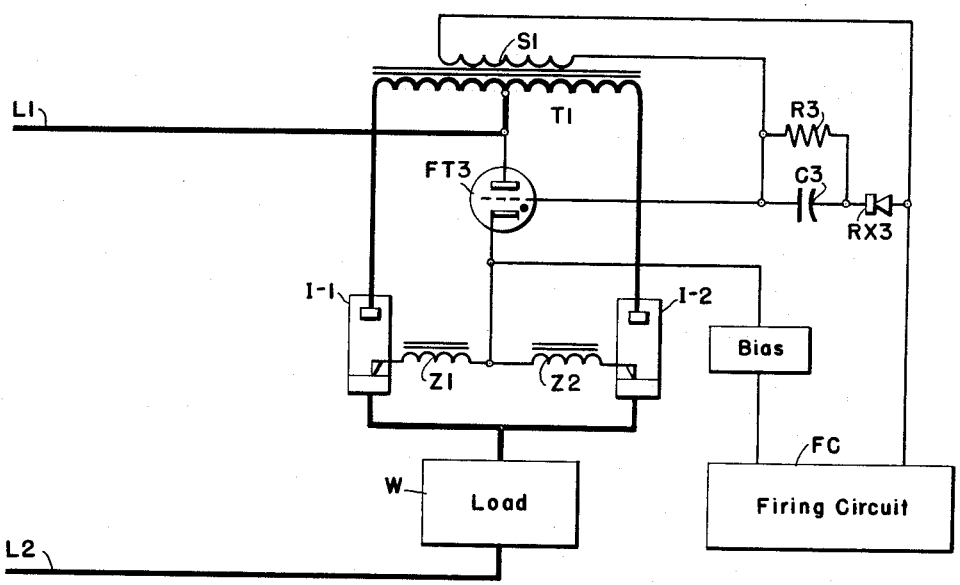
Fig. 3 is a further circuit diagram showing another modification of my invention.

Another modification of my invention similar to the Fig. 2 system is shown in Fig. 3. In this case the ignitrons I–1 and I–2 are fired through a single firing thyratron FT3 and reactors Z1 and Z2 respectively. The reactors may be of the saturable type and their saturation may be variable. So long as the ignitrons I–1 and I–2 conduct properly there is no output at the secondary S1 of transformer T1 and the firing circuit FC1 causes the ignitrons to fire simultaneously. Should one of the ignitrons I–1 or I–2 become defective, a blocking bias is impressed on thyratron FT3 by the output of S1 and prevents it from conducting further.

While I have shown and described certain specific embodiments of my invention, I am fully aware that many modifications thereof are possible. My invention, therefore, is not to be restricted except insofar as is necessitated by the prior art.

I claim as my invention:

1. A sequence timer for welding apparatus including means for timing a welding operation, impedance means connected to said timing means to terminate said welding operation when current is supplied thereto, and means responsive to said timing means for supplying current to said impedance means, said sequence timer being characterized by the fact that the responsive means includes a pair of electric discharge paths each defined by an anode and a cathode, by means for connecting said paths in effect in parallel to said impedance means, by means for maintaining said paths non-conductive during said welding operation and by means responsive to said timing means at the end of said welding operation for rendering both said paths conductive.

2. A sequence timer for welding apparatus comprising in combination means for timing a welding operation; means for initiating the operation of the timing means; and means for terminating the timing of said timing means, the last said means including an impedance through which current flows when the timing of said timing means is terminated; a pair of electric discharge paths each defined by an anode and a cathode in effect connected in parallel to said impedance means; means responsive to said timing means when it is to be terminated for rendering both said paths conductive; and means actuable when the conductivity of said paths is substantially different in response to said timing means for preventing said initiating means from initiating a succeeding operation of said timing means.

3. A sequence timer for a welder comprising in combination means for timing a welding operation; means for terminating the timing of said timing means, the last said means including an impedance through which current flows when the timing of said timing means is terminated; a pair of electric discharge paths each defined by an anode and a cathode in effect connected in parallel to said impedance means; and means responsive to said timing means when it is to be terminated for rendering both said paths conductive.

4. A sequence timer comprising means for starting the flow of welding current during a welding operation; a weld time network responsive to said starting means to start timing out when said welding current starts to flow; a pair of electric discharge paths each defined by an anode and a cathode and each having a control electrode; impedance means having terminal connections and an intermediate connection; means for connecting said impedance through its terminal connections in the anode-cathode circuits of both said discharge paths; a circuit including said intermediate connection connected to said starting means for actuating said starting means to stop the flow of welding current when at least one of said discharge paths is conductive; and means for connecting said weld time network to said control electrodes so that said discharge paths remain non-conductive when said weld time network is set for timing and while it is timing out and said paths are rendered conductive when said network times out and before it is again reset for timing.

5. A sequence timer comprising means for starting the flow of welding current in a welding operation; a weld time network responsive to said starting means to start timing out when said welding current starts to flow; a pair of electric discharge paths each defined by an anode and a cathode and each having a control electrode; impedance means having terminal connections and an intermediate connection; means for connecting said impedance through its terminal connections in the anode-cathode circuits of both said discharge paths; a circuit including said intermediate connection connected to said starting means for actuating said starting means to stop the flow of welding current when at least one of said discharge paths is conductive; means for connecting said weld time network to said control electrodes so that said discharge paths remain non-conductive when said weld time network is set for timing and while it is timing out and said paths are rendered conductive when said network times out and before it is again reset for timing; and means responsive to said impedance when the conductivity of said devices is substantially different for preventing the resetting of said weld time network.

6. A sequence timer including a weld time network; a pair of electric discharge paths each defined by a pair of principal electrodes and having a control electrode; a circuit in which said principal electrodes are connected in parallel; means for connecting said network between the control electrode and one principal electrode each of said discharge paths; means for setting said network for a timing operation, said network when so set impressing a blocking potential between said control electrodes and said principal electrodes; means for starting and maintaining the flow of welding current and at the same time starting the timing out of said network, said network while it is timing out maintaining said discharge paths blocked and after it times out permitting said discharge paths to conduct current through said circuit; and means, for connecting said circuit to said starting and maintaining means, responsive to said current through said circuit for stopping said welding current and for connecting said circuit to said setting means for causing said network to reset in response to the flow of said current through said circuit.

7. A sequence timer including a weld time network; a pair of electric discharge paths each defined by a pair of principal electrodes and having a control electrode; a circuit in which said principal electrodes are connected in parallel; means for connecting said network between the control electrodes and one principal electrode, each of said discharge paths; means for setting said network for a timing operation, said network when so set impressing a blocking potential between said control electrodes and said principal electrodes; means for starting and maintaining the flow of welding current and at the same time starting the timing out of said network, said network while it is timing out maintaining said discharge paths blocked and after it times out permitting said discharge paths to conduct current through said circuit; means for connecting said circuit to said starting and maintaining means, responsive to said current through said circuit, for stopping said welding current and for connecting said circuit to said setting means for causing said network to reset in response to the flow of said current through said circuit; and means responsive to said circuit when the conductivity of said discharge devices is substantially different for preventing said setting means from resetting said network.

8. A sequence timer according to claim 7 characterized by a transformer, the primary of which has a pair of terminal connections and an intermediate connection, the principal electrodes of the discharge paths being connected in parallel through said primary and being connected in the circuit through the intermediate connection and by means for connecting the secondary of said transformer to said setting means so that when current flows through said secondary said setting means is blocked.

9. A sequence timer for welding apparatus characterized by a pair of hold discharge devices connected in parallel so that both can conduct to start the hold time during any normal welding sequence and by means responsive to the conduction of only one of said devices during a weld sequence for preventing the completion of the next sequence.

10. A sequence timer for welding apparatus characterized by a pair of hold discharge paths each defined by an anode and a cathode; a transformer including a secondary and a primary which primary has terminal connections and an intermediate connection; a first power supply conductor; a second power supply conductor; a network for starting the hold time; means for connecting one of said anodes each to a terminal connection; means for connecting said cathodes to said second conductor; means including said network for connecting said intermediate connection to said first conductor; a third discharge path defined by an anode and a cathode and including a control electrode; a second network for starting the weld time; means for connecting said cathode of said third path to said second conductor; means for connecting said anode of said third path to said first conductor through said second network; means connected to said control electrode for maintaining said path conductive to prevent the start of weld time and for blocking said path to start a weld time; means responsive to the conduction of both said first paths at the start of each hold time for again rendering said third path conductive; and means for connecting said secondary between the control electrode and the cathode of said third path to block said third path after a hold time if the conductivity of said paths is substantially different at the start of a hold time.

11. In combination a first supply conductor; a second supply conductor; a pair of electric discharge paths each defined by a pair of principal electrodes and having a control electrode; a transformer having secondary means and a primary having terminal connections and an intermediate connection; means for connecting said terminal connections one each to a principal electrode of one of said paths; means for connecting said other principal electrodes together; a pair of load conductors; means for connecting in series said first and second supply conductors, said intermediate connection, said other principal electrodes and said load conductors; and means for coupling said secondary means to said control electrodes to provide biasing means dependent on the current conducted through said primary for said paths.

12. In combination a first supply conductor; a second supply conductor; a pair of electric discharge paths each defined by a pair of principal electrodes and having a control electrode; a transformer having a pair of secondaries and a primary which primary has terminal connections and an intermediate connection; means for connecting said terminal connections one each to a principal electrode of one of said paths; means for connecting said other principal electrodes together; a pair of load conductors; means for connecting in series said first and second supply conductors, said intermediate connection, said other principal electrodes and said load conductors; a capacitor connected between each of said control electrodes and an associated principal electrode; and means including a rectifier for connecting each of said secondaries across an associated capacitor.

13. In combination a first supply conductor; a second supply conductor; a pair of electric discharge paths each defined by a pair of principal electrodes and having a control electrode; a transformer having secondary means and a primary which primary has terminal connections and an intermediate connection; means for connecting said terminal connections one each to a principal electrode of one of said paths; means for connecting said other principal electrodes together; a pair of load conductors; means for connecting in series said first and second supply conductors, said intermediate connection, said other principal electrodes and said load conductors; firing means connected to said control electrodes of said discharge devices for firing them simultaneously; and means responsive to the appearance of a potential across said secondary means for blocking the operation of said firing means.

14. In combination a first supply conductor; a second supply conductor; a pair of electric discharge paths each defined by a pair of principal electrodes and having a control electrode; a transformer having secondary means and a primary which primary has terminal connections and an intermediate connection; means for connecting said terminal connections one each to a principal electrode of one of said paths; means for connecting said other principal electrodes together; a pair of load conductors; means for connecting in series said first and second supply conductors, said intermediate connection, said other principal electrodes and said load conductors; an auxiliary electric discharge path defined by an anode and a cathode and having a control electrode, means for connecting said anode and cathode of said auxiliary path in circuit with both said control electrodes of said main paths, means connected to said control electrode of said auxiliary path for firing said auxiliary path to fire said main paths; and means responsive to the appearance of a potential across said secondary means connected to said firing means for blocking the operation of said firing means.

15. Apparatus according to claim 14 characterized by responsive means which includes a capacitor and a rectifier and by connections to the secondary means for charging the capacitor through the rectifier when a potential appears across the secondary.

16. A sequence timer for welding apparatus including means for timing a welding operation, impedance means connected to said timing means to terminate said welding operation when current is supplied thereto, and means responsive to said timing means for supplying current to said impedance means, said sequence timer being characterized by the fact that the responsive means includes a pair of electric discharge paths each defined by an anode and a cathode, and each having a control electrode, by means for connecting said paths in effect in parallel to said impedance means, by means for maintaining said paths nonconductive during said welding operation and by means responsive to said timing means and connected to said control electrodes in common at the end of said welding operation for rendering both said paths conductive.

17. In combination a first electric discharge path having an anode, a cathode and a control electrode; a second electric discharge path having an anode, a cathode and a control electrode; impedance means; power supply means; control potential supply means; means connecting said anodes and cathodes of said paths, said power supply means and said impedance means in a circuit such that current conducted through said impedance means from said power supply means through said anode and cathode of said first path is at opposite polarity to current conducted through said impedance means from said power supply means through said anode, and cathode of said second path; and means for connecting said control potential supply means to both said control electrodes in common.

References Cited in the file of this patent

UNITED STATES PATENTS

| | | |
|---|---|---|
| 2,207,540 | Hansell | July 9, 1940 |
| 2,221,517 | Holters | Nov. 12, 1940 |
| 2,429,186 | Johnson et al. | Oct. 14, 1947 |
| 2,614,240 | Bivens | Oct. 14, 1952 |